(12) United States Patent
Chiao et al.

(10) Patent No.: US 12,493,218 B1
(45) Date of Patent: Dec. 9, 2025

(54) DISPLAY APPARATUS

(71) Applicant: HannStar Display Corporation, Taipei (TW)

(72) Inventors: Yu-Chi Chiao, Taipei (TW); Hsu-Ho Wu, Taipei (TW); Yu-Cheng Lin, Taipei (TW); Chun-Ming Hsu, Taipei (TW); Yen-Chung Chen, Taipei (TW); Chia-Feng Teng, Taipei (TW); Wei-Chih Hsu, Taipei (TW); Chao-Yun Wu, Taipei (TW); Hsin Liang Lai, Taipei (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/959,499

(22) Filed: Nov. 25, 2024

Related U.S. Application Data

(60) Provisional application No. 63/657,128, filed on Jun. 7, 2024.

(30) Foreign Application Priority Data

Sep. 27, 2024 (CN) .......................... 202411362240.6

(51) Int. Cl.
*G02F 1/13357* (2006.01)

(52) U.S. Cl.
CPC .... *G02F 1/133615* (2013.01); *G02F 1/13362* (2013.01)

(58) Field of Classification Search
CPC ........................................ G02F 1/1335–133638
See application file for complete search history.

(56) References Cited

U.S. PATENT DOCUMENTS

| | | | |
|---|---|---|---|
| 8,749,732 B2 * | 6/2014 | Ji .......................... | G02B 6/0085 362/612 |
| 8,780,290 B2 * | 7/2014 | Chen .................... | G02B 6/0031 349/65 |
| 10,209,545 B2 * | 2/2019 | Chen .................. | G02F 1/133308 |

* cited by examiner

*Primary Examiner* — Jason M Han
(74) *Attorney, Agent, or Firm* — JCIPRNET

(57) ABSTRACT

A display apparatus including a frame, a cover, a display panel, a light source and a reflective layer is provided. The cover is connected to the frame to form an accommodating space. The display panel is disposed in the accommodating space. The light source is disposed on the frame and adjacent to the cover. The reflective layer is disposed on a first surface of the cover facing the frame, and is located between the light source and the cover. The reflective layer extends between the light source and the display panel, and does not overlap a display area of the display apparatus.

14 Claims, 8 Drawing Sheets

DISPLAY APPARATUS

CROSS-REFERENCE TO RELATED APPLICATION

This application claims the priority benefit of U.S. provisional application Ser. No. 63/657,128, filed on Jun. 7, 2024 and China application serial no. 202411362240.6, filed on Sep. 27, 2024. The entirety of each of the above-mentioned patent applications is hereby incorporated by reference herein and made a part of this specification.

BACKGROUND

Technical Field

The disclosure relates to a display technology, and in particular, to a display apparatus.

Description of Related Art

Reflective or transflective display apparatuses have gradually attracted attention due to their low power consumption operation. To maintain display quality in low ambient light conditions, these display apparatuses are often equipped with a front light module to meet the illumination requirements during display. However, conventional front light modules tend to create stray light on the surface of the light guide plate, resulting in poor display contrast and color performance of the display apparatuses. In addition, in order to protect the front light module, a protective cover is typically affixed on the side of the light guide plate facing away from the display panel. Due to the air gap between the protective cover and the light guide plate, light can easily form stray light when passing through the protective cover or reflecting off the protective cover, leading to a decline in the clarity of the display image.

SUMMARY

The disclosure provides a display apparatus with improved display contrast and color performance of display images.

According to an embodiment of the disclosure, a display apparatus includes a frame, a cover, a display panel, a light source and a reflective layer. The cover is connected to the frame to form an accommodating space. The display panel is disposed in the accommodating space. The light source is disposed on the frame and adjacent to the cover. The reflective layer is disposed on a first surface of the cover facing the frame, and is located between the light source and the cover. The reflective layer extends between the light source and the display panel, and does not overlap a display area of the display apparatus.

In an embodiment of the disclosure, the display apparatus further includes a reflective sheet disposed between the frame and the cover. In a normal direction of the first surface of the cover, the reflective layer and the reflective sheet are respectively located on two opposite sides of the light source.

In an embodiment of the disclosure, a spacing between the reflective sheet and the reflective layer of the display apparatus along the normal direction of the first surface of the cover is greater than or equal to 0.5 mm and less than or equal to 50 mm.

In an embodiment of the disclosure, a shortest distance between the light source and the display area of the display apparatus is greater than or equal to 0.5 mm and less than or equal to 100 mm.

In an embodiment of the disclosure, the display apparatus further includes a diffusion layer disposed on the first surface or a second surface facing away from the first surface of the cover and overlapping the display area. A haze value of the diffusion layer is greater than or equal to 3% and less than or equal to 40%.

In an embodiment of the disclosure, the display apparatus further includes a refractive layer disposed on the first surface or a second surface facing away from the first surface of the cover and overlapping the display area. The refractive layer is provided with a plurality of optical microstructures on a surface facing away from the cover.

In an embodiment of the disclosure, a light diffusion layer of the display apparatus is provided on a light emitting surface of the light source.

In an embodiment of the disclosure, the display apparatus further includes a rotating mechanism movably arranged on the frame and having a rotating axis parallel to the first surface of the cover. The light source is disposed on the rotating mechanism and has a light emitting surface. An included angle is provided between a normal direction of the light emitting surface and the first surface. The rotating mechanism is adapted to drive the light source to rotate along the rotating axis to change the included angle.

In an embodiment of the disclosure, the light source of the display apparatus has a light emitting surface, and the light emitting surface is inclined toward the display panel.

In an embodiment of the disclosure, at least one anti-reflection layer is disposed on at least one of the first surface and a second surface facing away from the first surface of the cover of the display apparatus.

In an embodiment of the disclosure, a polarizer is disposed on a display surface of the display panel of the display apparatus. An anti-reflection layer, an anti-glare layer, a low-reflection layer, or a combination thereof is disposed on one side of the polarizer facing away from the display panel.

In an embodiment of the disclosure, the display apparatus further includes a light control film disposed between the display panel and the polarizer.

In an embodiment of the disclosure, the frame of the display apparatus has a portion extending between the light source and the display panel. In a normal direction of the first surface of the cover, the portion of the frame and the reflective layer are respectively located on two opposite sides of the light source. A material of the frame includes white reflective material.

In an embodiment of the disclosure, the display apparatus further includes a light absorbing layer disposed between the reflective layer and the cover. The light absorbing layer defines the display area of the display apparatus.

Based on the above, in a display apparatus according to an embodiment of the disclosure, a display panel is arranged in an accommodating space formed by a frame and a cover. A light source suitable for illuminating the display panel is positioned adjacent to the cover on the frame. Therefore, the light emitted from the light source can be diffused in a sufficient space, thereby improving the brightness uniformity of the display image. Additionally, a reflective layer extending between the light source and the display panel is provided on a side surface of the cover facing the light source. The configuration of the reflective layer can effectively suppress the formation of stray light during the transmission of light to the display area, thereby maintaining the display quality of the display apparatus while meeting the illumination requirements.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The aforementioned technical contents, features and effects of the present invention will be clearly presented in the following detailed description of a preferred embodiment with reference to the drawings. The directional terms used in the following embodiments, such as up, down, left, right, front, or rear, are for reference to the directions indicated in the accompanying drawings. Therefore, these directional terms are used for explanation purposes and not for limiting the scope of the invention.

Figure 1:
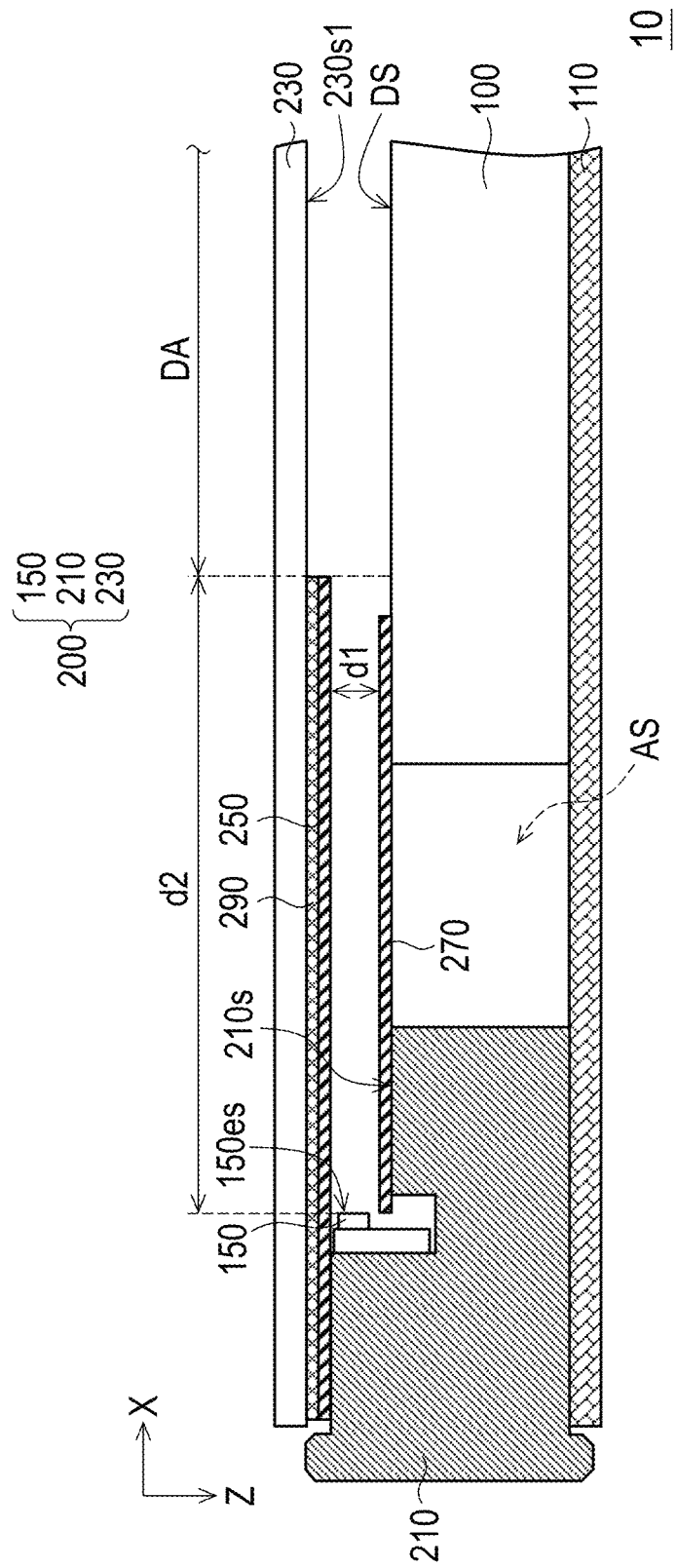
FIG. 1 is a schematic cross-sectional view of a display apparatus according to a first embodiment of the disclosure.

FIG. 1 is a schematic cross-sectional view of a display apparatus according to a first embodiment of the disclosure. Referring to FIG. 1, a display apparatus 10 includes a display panel 100 and a light box 200. The light box 200 has an accommodating space AS, and the display panel 100 is disposed in the accommodating space AS of the light box 200. In the embodiment, both the display panel 100 and a frame 210 can be fixed on a back plate 110, but the disclosure is not limited thereto. In detail, the light box 200 is composed of the frame 210, a cover 230 and a light source 150. For example, the frame 210 may be disposed around the display panel 100 and, together with the connected cover 230, define the accommodating space AS of the light box 200.

The light source 150 is disposed on the frame 210 and is suitable for providing illumination light for the display panel 100. In the embodiment, the light source 150 is, for example, a light bar or a light board, and a plurality of light sources 150 may be provided on two opposite sides of the display panel 100 along a direction (e.g., direction X). In other embodiments, a light source 150 may be provided on each side of the display panel 100, but the disclosure is not limited thereto. It is particularly noted that the light source 150 is positioned on the frame 210, adjacent to the cover 230, and is not disposed close to a display surface DS of the display panel 100. Therefore, the light emitted by the light source 150 can diffuse in a sufficient space within the light box 200, which helps to increase the uniformity of illumination on the display surface DS, thereby improving the brightness uniformity of the display image.

Furthermore, the display apparatus 10 is further provided with a reflective layer 250 on a first surface 230$s$1 of the cover facing the frame 210. The reflective layer 250 is located between the cover 230 and the light source 150, and does not overlap a display area DA of the display panel 100 along a normal direction (e.g., direction Z) of the first surface 230$s$1. The reflective layer 250 may extend from one side of the light source 150 to one side of the display surface DS of the display panel 100, so as to effectively suppress stray light generated by the light emitted from the light source 150 during its transmission to the display area DA of the display panel 100, thereby maintaining the display quality (e.g., display contrast and color performance) of the display apparatus while meeting the illumination requirements.

In order to further improve the light energy utilization rate of the light source 150, in the embodiment, the display apparatus 10 may further include a reflective sheet 270 disposed between the frame 210 and the cover 230. More specifically, the reflective sheet 270 is disposed on a surface 210$s$ of the frame 210 facing the cover 230, and extends to the display surface DS of the display panel 100. From another point of view, in the normal direction of the first surface 230$s$1, the reflective layer 250 and the reflective sheet 270 are respectively located on two opposite sides of the light source 150, and a distance d1 between the reflective layer 250 and the reflective sheet 270 is preferably greater than or equal to 0.5 mm and less than or equal to 50 mm.

On the other hand, to ensure that the light emitted by the light source 150 can diffuse uniformly in a sufficient space, a shortest distance d2 between the light source 150 and the display area DA of the display panel 100 in a normal direction (e.g., direction X) of a light emitting surface 150$es$ of the light source 150 is preferably greater than or equal to 0.5 mm and less than or equal to 100 mm. Thus, with the arrangement of the reflective layer 250 and the reflective sheet 270, it can effectively avoid the hot spot phenomenon that typically occurs at the edge of the display area DA when using conventional light sources.

In the display apparatus 10 of the embodiment, the light box 200 may further be provided with a light absorbing layer 290 between the reflective layer 250 and the cover 230. The light absorbing layer 290 may define the display area DA of the display apparatus 10. The provision of the light absorbing layer 290 may significantly reduce the reflection of ambient light by the reflective layer 250, thereby improving the visual quality of the display apparatus 10.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 2:
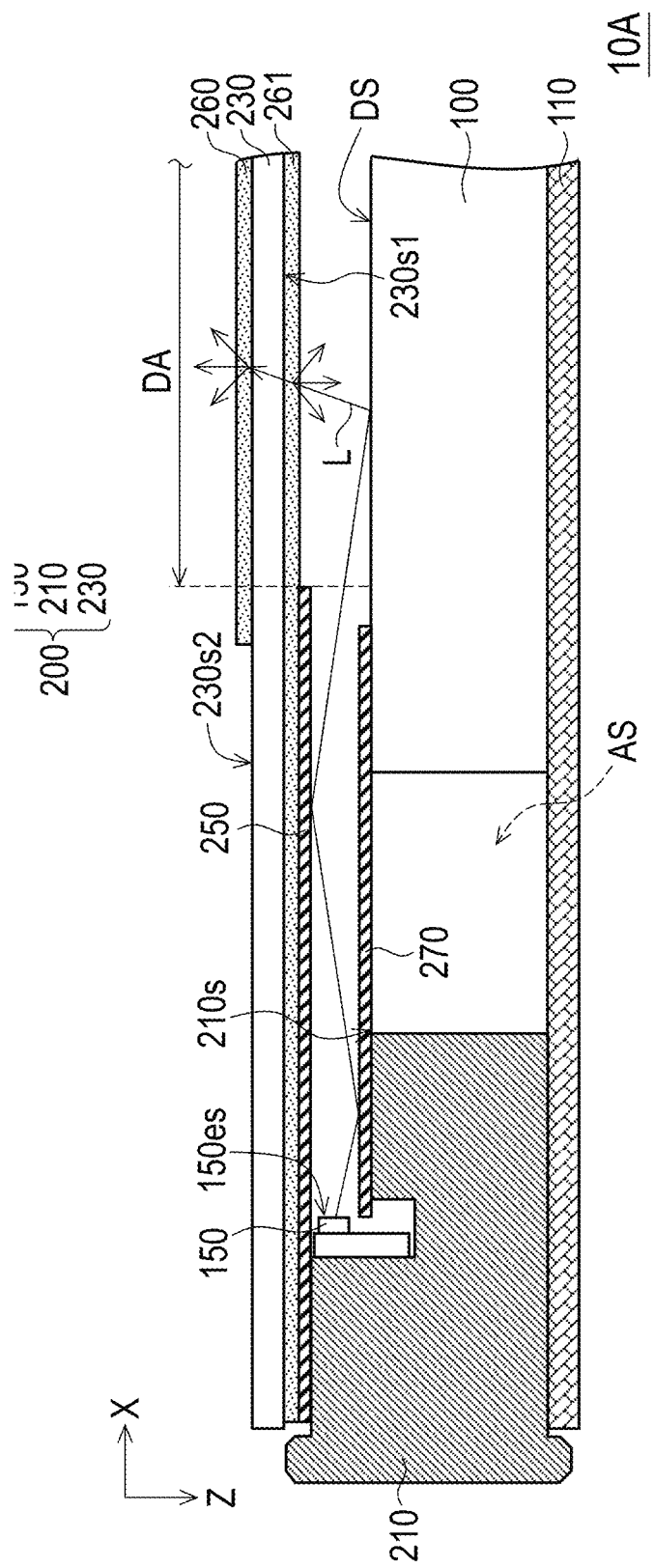
FIG. 2 is a schematic cross-sectional view of a display apparatus according to a second embodiment of the disclosure.

FIG. 2 is a schematic cross-sectional view of a display apparatus according to a second embodiment of the disclosure. Referring to FIG. 2, compared to the display apparatus 10 of FIG. 1, a display apparatus 10A of the embodiment may be further provided with a diffusion layer having a light scattering capability. In the embodiment, the display apparatus 10A is not provided with the light absorbing layer 290 of FIG. 1. For example, the display apparatus 10A may be provided with a diffusion layer 260 and a diffusion layer 261 on the first surface 230s1 and a second surface 230s2 of the cover 230 facing away from each other, respectively, and the two diffusion layers 260 and 261 overlap the display area DA along a normal direction of the display surface DS. Preferably, a haze value of each of the diffusion layer 260 and the diffusion layer 261 may be greater than or equal to 3% and less than or equal to 40%. The light L from the light source 150 and reflected by the display panel 100 may form a more uniform light distribution after passing through the diffusion layer 260 and the diffusion layer 261, thereby improving the brightness uniformity of the display image. Since the other components of the display apparatus 10A and their relative configurations are similar to those of the display apparatus 10 of FIG. 1, detailed descriptions may refer to the relevant paragraphs of the aforementioned embodiment and will not be repeated here.

Figure 3:
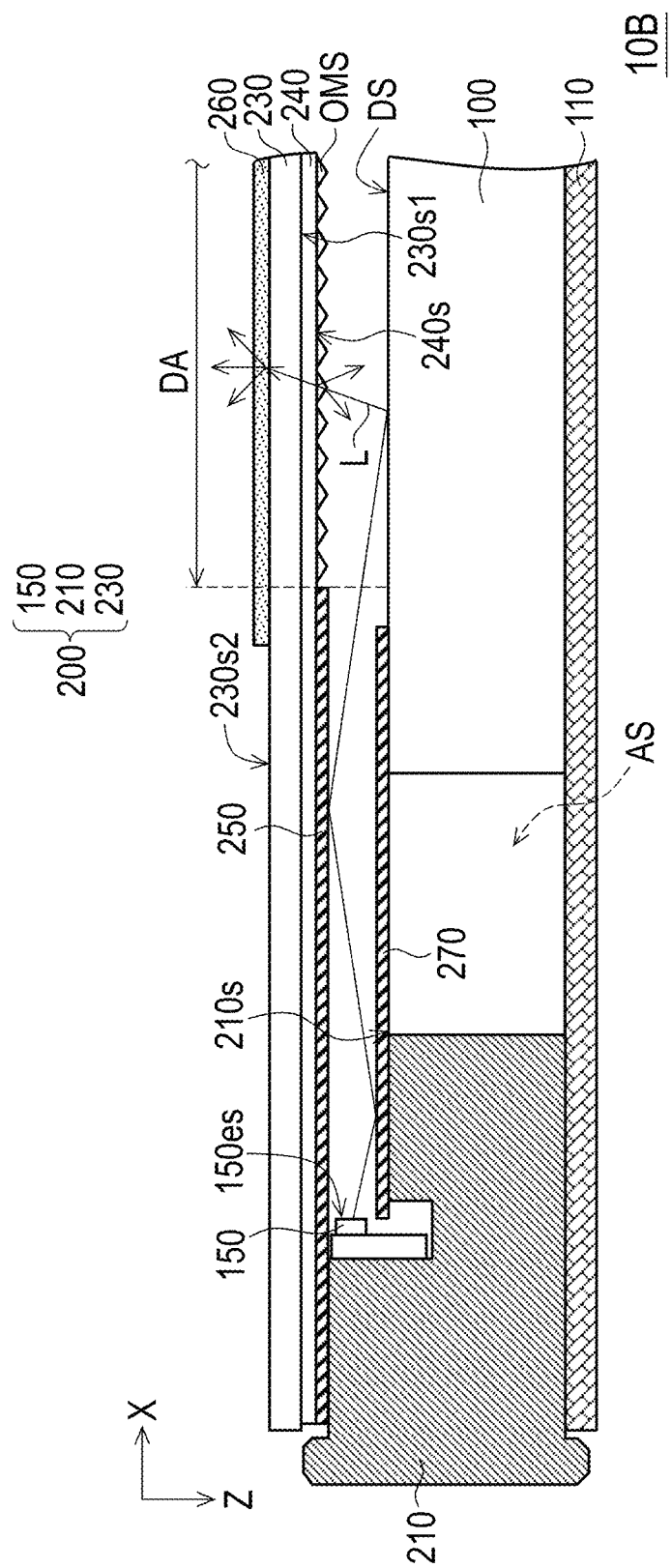
FIG. 3 is a schematic cross-sectional view of a display apparatus according to a third embodiment of the disclosure.

FIG. 3 is a schematic cross-sectional view of a display apparatus according to a third embodiment of the disclosure. Referring to FIG. 3, in the embodiment, a display apparatus 10B may further include a refractive layer 240, and the refractive layer 240 is used to replace the diffusion layer 261 disposed on the first surface 230s1 of the cover 230 in FIG. 2. The refractive layer 240 is provided with a plurality of optical microstructures OMS on a surface 240s facing away from the cover 230, and these optical microstructures OMS are suitable for deflecting the optical path of the light L. The provision of the refractive layer 240 may increase the flexibility of adjusting the light output distribution of the light L. It should be noted that, in the embodiment, the cross-sectional profile of the optical microstructure OMS on the XZ plane is exemplarily described in a triangular shape, and it does not mean that the invention is limited thereto. In other embodiments not shown, the profile of the optical microstructure may be adjusted according to different optical requirements, and the optical microstructure on the surface 240s may be distributed in strip, column or cone shapes. Since the other components of the display apparatus 10B and their relative configurations are similar to those of the display apparatus 10A of FIG. 2, detailed descriptions may refer to the relevant paragraphs of the aforementioned embodiment and will not be repeated here.

Figure 4:
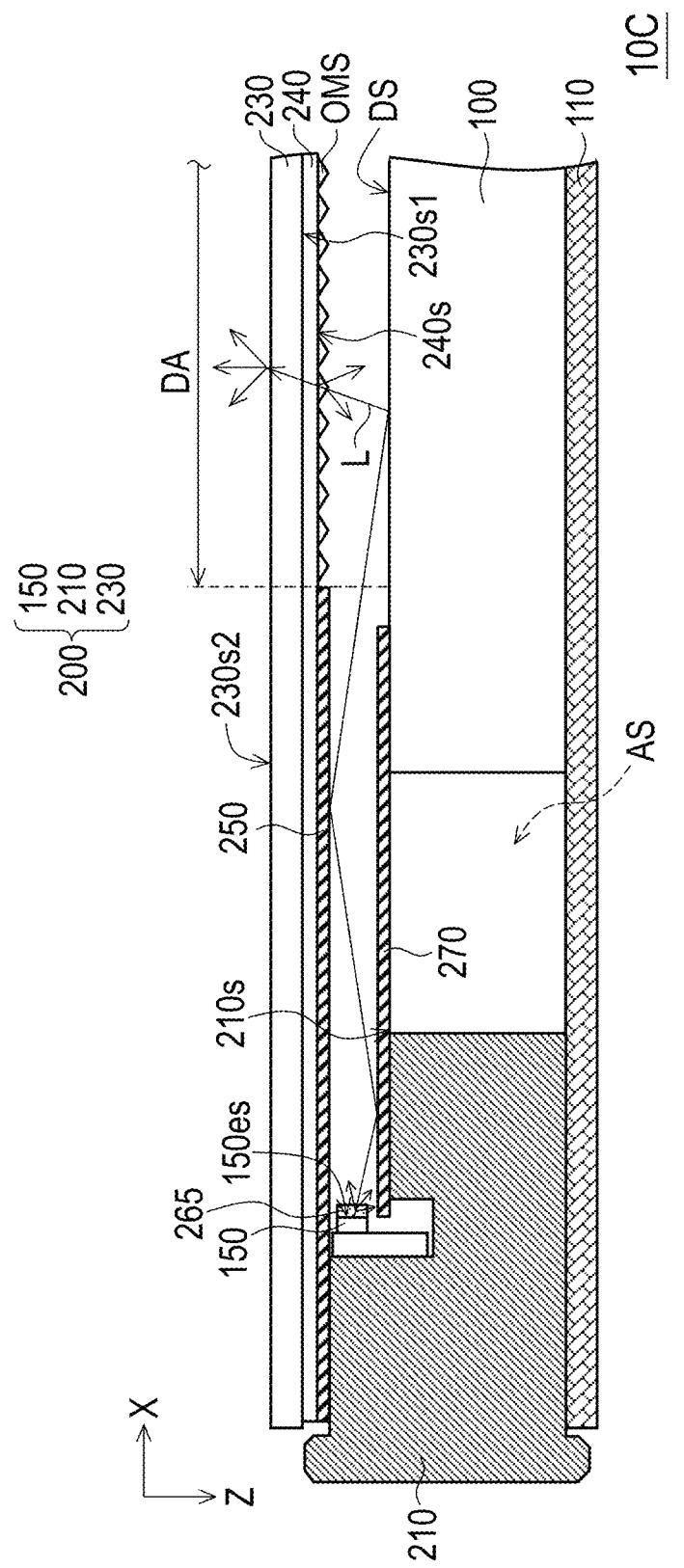
FIG. 4 is a schematic cross-sectional view of a display apparatus according to a fourth embodiment of the disclosure.

FIG. 4 is a schematic cross-sectional view of a display apparatus according to a fourth embodiment of the disclosure. Referring to FIG. 4, in the embodiment, a display apparatus 10C is not provided with the diffusion layer 260 disposed on the second surface 230s2 of the cover 230 in FIG. 3. Instead, a light diffusion layer 265 is disposed on the light emitting surface 150es of the light source 150 of the embodiment, and the light diffusion layer 265 may further expand the angle range of the light L emitted from the light source 150. Accordingly, the illumination uniformity of the light L for the display panel 100 in the display area DA can be increased. For example, the light diffusion layer 265 may be a film layer dispersed with scattering particles or wavelength conversion particles, but the disclosure is not limited thereto. Since the other components of the display apparatus 10C and their relative configuration are similar to those of the display apparatus 10B of FIG. 3, detailed descriptions may refer to the relevant paragraphs of the aforementioned embodiment, and will not be repeated here.

Figure 5:
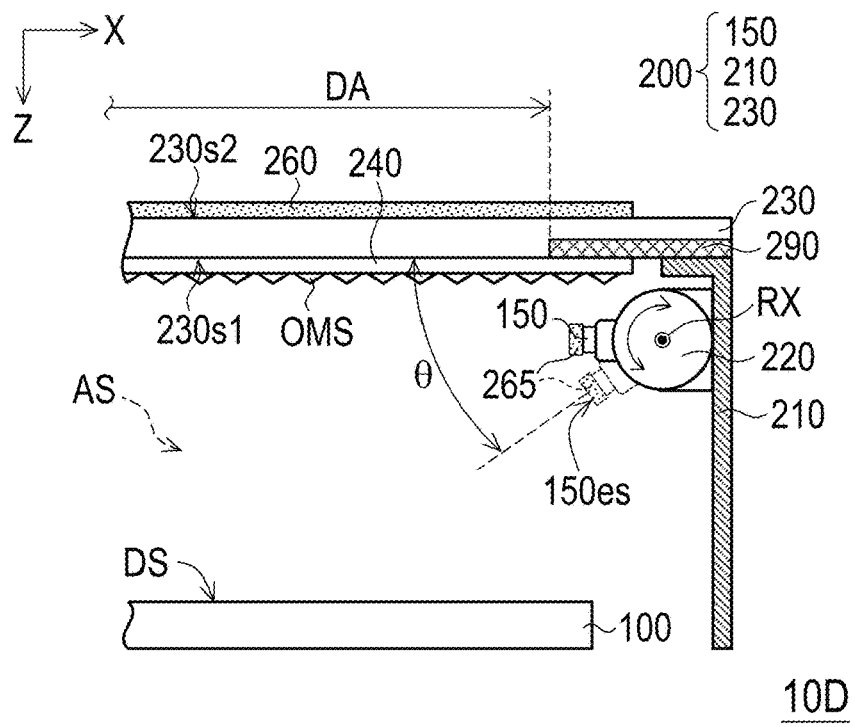
FIG. 5 is a schematic cross-sectional view of a display apparatus according to a fifth embodiment of the disclosure.

FIG. 5 is a schematic cross-sectional view of a display apparatus according to a fifth embodiment of the disclosure. Referring to FIG. 5, the main difference between a display apparatus 10D of the embodiment and the display apparatus 10B of FIG. 3 lies in that the configuration of the light source is different. For example, in the embodiment, the display apparatus 10D may further include a rotating mechanism 220. The rotating mechanism 220 is movably disposed on the frame 210 and has a rotating axis RX parallel to the first surface 230s1 of the cover 230. The light source 150 is disposed on the rotating mechanism 220, and an included angle θ is provided between the normal direction of the light emitting surface 150es and the first surface 230s1. The rotating mechanism 220 is suitable for driving the light source 150 to rotate along the rotating axis RX to change the included angle θ. The rotating mechanism 220 may be operated automatically, semi-automatically or manually.

Through the arrangement of the rotating mechanism 220, the user may adjust the illumination angle of the light from the light source 150 to the display surface DS according to different usage environments, thereby increasing the adaptability of the display apparatus 10D to different usage environments. In the embodiment, a light diffusion layer 265 as shown in FIG. 4 may be provided on the light emitting surface 150es of the light source 150. Therefore, detailed descriptions may refer to the relevant paragraphs of the aforementioned embodiment, and will not be repeated here.

It is particularly noted that in another modified embodiment of the display apparatus 10D, when a distance between the light source 150 and the display area DA is further increased, the reflective layer 250, as shown in FIG. 3, may also be provided on the first surface 230s1 of the cover 230.

Figure 6:
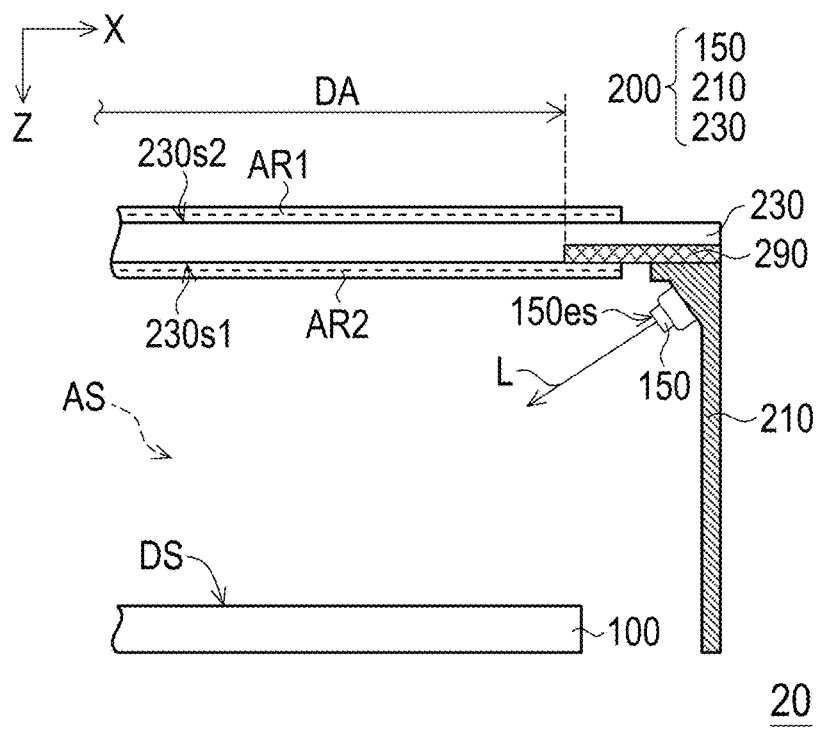
FIG. 6 is a schematic cross-sectional view of a display apparatus according to a sixth embodiment of the disclosure.

FIG. 6 is a schematic cross-sectional view of a display apparatus according to a sixth embodiment of the disclosure. Referring to FIG. 6, the main difference between the display apparatus 20 of the embodiment and the display apparatus 10A of FIG. 2 lies in that the configuration of the light source is different and the optical film layer disposed on the cover is different. Specifically, in the display apparatus 20 of the embodiment, the light emitting surface 150es of the light source 150 is inclined toward the display surface DS of the display panel 100. Accordingly, the illumination uniformity of the light L emitted by the light source 150 on the display surface DS may be increased.

On the other hand, in the embodiment, an anti-reflection layer AR2 and an anti-reflection layer AR1 are respectively disposed on the first surface 230s1 and the second surface 230s2 of the cover 230. The provision of the anti-reflection layer AR2 may suppress stray light generated by the light L on the first surface 230s1 of the cover 230, and the provision of the anti-reflection layer AR1 may reduce the glare caused by ambient light on the second surface 230s2 of the cover 230. In other words, the provision of the two anti-reflection layers AR1 and AR2 may effectively enhance the visual effect of the light box 200. Since the other components of the display apparatus 20 and their relative configurations are similar to those of the display apparatus 10A of FIG. 2, detailed descriptions may refer to the relevant paragraphs of the aforementioned embodiment, and will not be repeated here.

Figure 7:
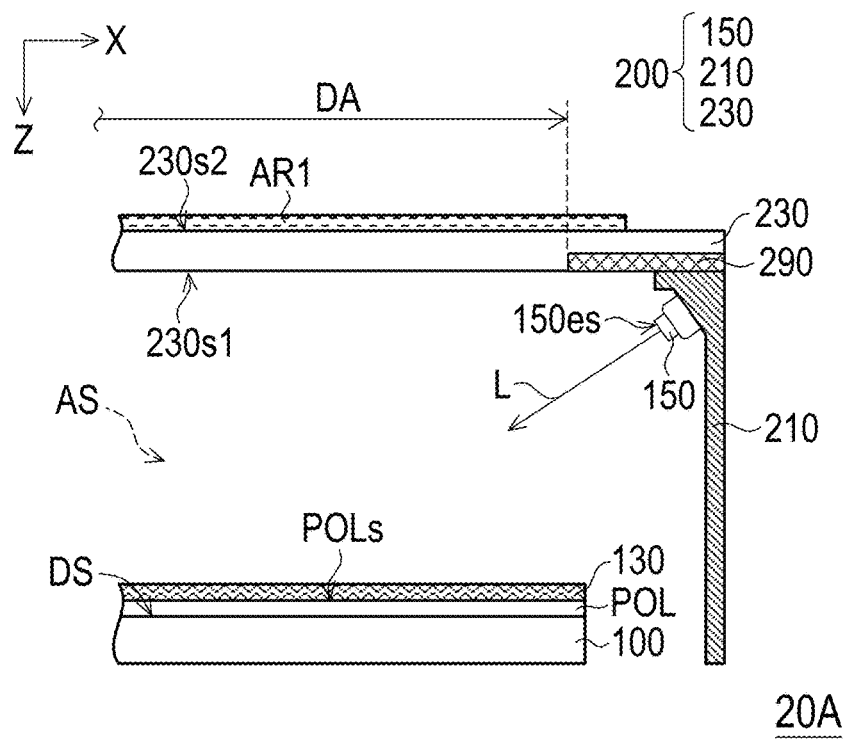
FIG. 7 is a schematic cross-sectional view of a display apparatus according to a seventh embodiment of the disclosure.

FIG. 7 is a schematic cross-sectional view of a display apparatus according to a seventh embodiment of the disclosure. Referring to FIG. 7, in a display apparatus 20A of the embodiment, the anti-reflection layer AR2 in FIG. 6 is not provided on the first surface 230s1 of the cover 230, but a polarizer POL is provided on the display surface DS of the display panel 100. In the embodiment, a surface POLs of the polarizer POL facing away from the display panel 100 may be a glossy surface. In order to suppress the glare formed by the light L on the surface POLs of the polarizer POL, a surface treatment layer 130 may be provided on the surface POLs of the polarizer POL. For example, the surface treatment layer 130 may be an anti-reflection layer (AR), an anti-glare layer (AG), a low-reflection layer (LR), or a combination thereof. Accordingly, the visual effect of the user when viewing the display panel 100 through the light box 200 may be effectively improved. Since the other components of the display apparatus 20A and their relative configurations are similar to those of the display apparatus 20 of FIG. 6, detailed descriptions may refer to the relevant paragraphs of the aforementioned embodiment and will not be repeated here.

Figure 8:
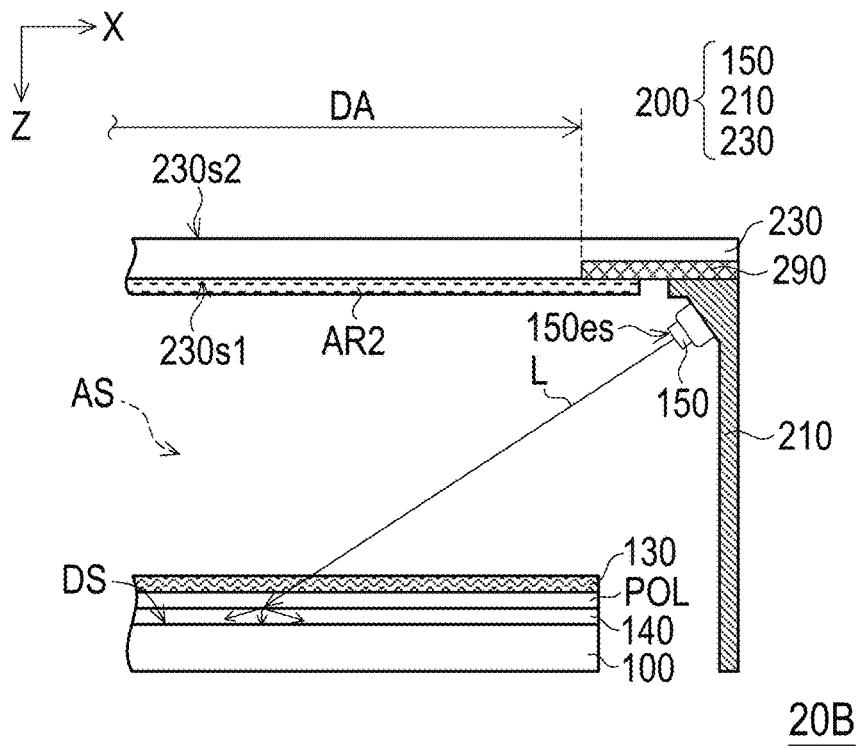
FIG. 8 is a schematic cross-sectional view of a display apparatus according to an eighth embodiment of the disclosure.
Figure 9A:
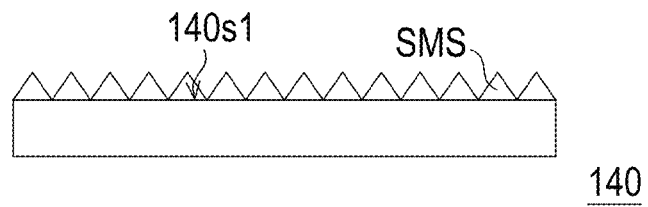
FIG. 9A is an enlarged schematic diagram of a light control film of FIG. 8.
Figure 9B:
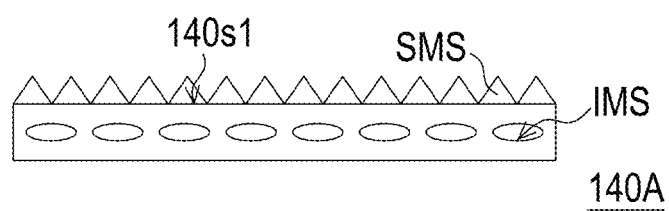
FIG. 9B is a schematic cross-sectional view of another embodiment of the light control film of FIG. 8.
Figure 9C:
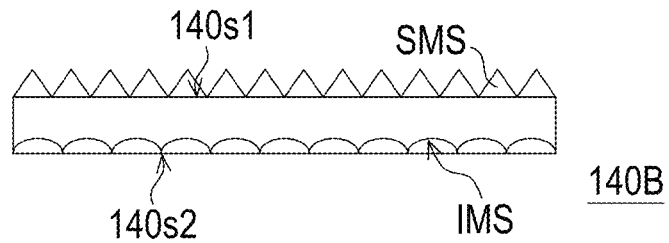
FIG. 9C is a schematic cross-sectional view of still another embodiment of the light control film of FIG. 8.

FIG. 8 is a schematic cross-sectional view of a display apparatus according to an eighth embodiment of the disclosure. FIG. 9A is an enlarged schematic diagram of a light control film of FIG. 8. FIG. 9B is a schematic cross-sectional view of another embodiment of the light control film of FIG. 8. FIG. 9C is a schematic cross-sectional view of still another embodiment of the light control film of FIG. 8. Referring to FIG. 8, the difference between a display apparatus 20B of the embodiment and the display apparatus 20A of FIG. 7 lies in that the side of the cover provided with the anti-reflection layer is different and the film layer structure on the display panel is different. Specifically, in the display apparatus 20B of the embodiment, the anti-reflection layer AR1 in FIG. 7 is not provided on the second surface 230s2 of the cover 230, but the anti-reflection layer AR2 in FIG. 6 is provided on the first surface 230s1 thereof.

On the other hand, in the embodiment, a light control film 140 may also be provided on the display surface DS of the display panel 100, and the light control film 140 is disposed between the display panel 100 and the polarizer POL. The light control film 140 is suitable for concentrating light L incident from different angles into a front viewing angle range of the display apparatus 20B, thereby improving the overall brightness and uniformity of the display image. Referring to FIG. 9A, for example, in the embodiment, the light control film 140 may be an optical film having a plurality of surface microstructures SMS on a surface 140s1. However, the disclosure is not limited thereto. Referring to FIG. 9B, in another modified embodiment, compared to the light control film 140 of FIG. 9A, a light control film 140A may be provided with a plurality of internal microstructures IMS within the substrate in addition to the plurality of surface microstructures SMS on the surface of the substrate. These internal microstructures IMS are, for example, a plurality of cavities in the substrate or a plurality of optical bodies filled in these cavities and having a refractive index different from that of the substrate. Referring to FIG. 9C, in still another embodiment, these internal microstructures IMS may be disposed on a surface 140s2 of the light control film 140B facing away from the surface microstructures SMS, and one end point or edge of these internal microstructures IMS may be substantially aligned with the surface 140s2, but the disclosure is not limited thereto. Since the other components of the display apparatus 20B and their relative configurations are similar to those of the display apparatus 20A of FIG. 7, detailed descriptions may refer to the relevant paragraphs of the aforementioned embodiment, and will not be repeated here.

Figure 10:
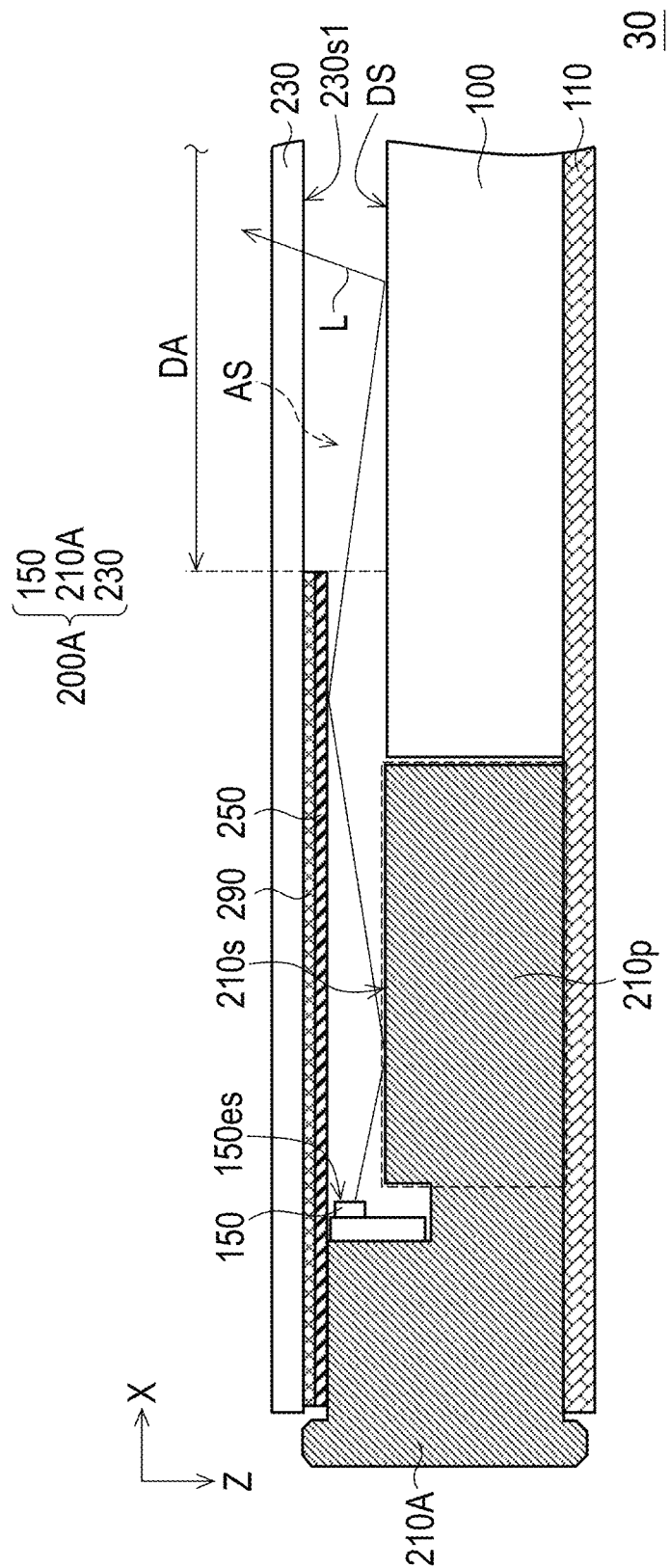
FIG. 10 is a schematic cross-sectional view of a display apparatus according to a ninth embodiment of the disclosure.

FIG. 10 is a schematic cross-sectional view of a display apparatus according to a ninth embodiment of the disclosure. Referring to FIG. 10, compared to the display apparatus 10 of FIG. 1, a display apparatus 30 of the embodiment is not provided with the reflective sheet 270 in FIG. 1. Instead, the frame 210A constituting the light box 200A of the embodiment further has a portion 210p extending between the light source 150 and the display panel 100, and a material of the frame 210A includes white reflective material. More specifically, the frame 210A of the embodiment has a sufficiently high reflectivity for visible light, and thus can be used to replace the reflective sheet 270 of FIG. 1. Since the other components of the display apparatus 30 and their relative configurations are similar to those of the display apparatus 10 of FIG. 1, detailed descriptions may refer to the relevant paragraphs of the aforementioned embodiment, and will not be repeated here.

To sum up, in a display apparatus according to an embodiment of the disclosure, a display panel is arranged in an accommodating space formed by a frame and a cover. A light source suitable for illuminating the display panel is positioned adjacent to the cover on the frame. Therefore, the light emitted from the light source can be diffused in a sufficient space, thereby improving the brightness uniformity of the display image. Additionally, a reflective layer extending between the light source and the display panel is provided on a side surface of the cover facing the light source. The configuration of the reflective layer can effectively suppress the formation of stray light during the transmission of light to the display area, thereby maintaining the display quality of the display apparatus while meeting the illumination requirements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
   a frame;
   a cover, connected to the frame to form an accommodating space;
   a display panel, disposed in the accommodating space;
   a light source, disposed on the frame and adjacent to the cover; and
   a reflective layer, disposed on a first surface of the cover facing the frame, and located between the light source and the cover, wherein the reflective layer extends between the light source and the display panel, and does not overlap a display area of the display apparatus, the light source is located on one side of a display surface of the display panel, the cover overlaps the display area, and the reflective layer extends from one side of the light source to one side of the display surface of the display panel.

2. The display apparatus according to claim 1, further comprising:
   a reflective sheet, disposed between the frame and the cover, wherein in a normal direction of the first surface of the cover, the reflective layer and the reflective sheet are respectively located on two opposite sides of the light source.

3. The display apparatus according to claim 2, wherein a spacing between the reflective sheet and the reflective layer along the normal direction of the first surface of the cover is greater than or equal to 0.5 mm and less than or equal to 50 mm.

4. The display apparatus according to claim 1, wherein a shortest distance between the light source and the display area is greater than or equal to 0.5 mm and less than or equal to 100 mm.

5. The display apparatus according to claim 1, further comprising:
   a diffusion layer, disposed on the first surface or a second surface facing away from the first surface of the cover, and overlapping the display area, wherein a haze value of the diffusion layer is greater than or equal to 3% and less than or equal to 40%.

6. The display apparatus according to claim 1, further comprising:
   a refractive layer, disposed on the first surface or a second surface facing away from the first surface of the cover, and overlapping the display area, wherein the refractive layer is provided with a plurality of optical microstructures on a surface facing away from the cover.

7. The display apparatus according to claim 1, wherein a light diffusion layer is provided on a light emitting surface of the light source.

8. The display apparatus according to claim 1, further comprising:
   a rotating mechanism, movably arranged on the frame, and having a rotating axis parallel to the first surface of the cover, wherein the light source is disposed on the rotating mechanism and has a light emitting surface, an included angle is provided between a normal direction of the light emitting surface and the first surface, and the rotating mechanism is adapted to drive the light source to rotate along the rotating axis to change the included angle.

9. The display apparatus according to claim 1, wherein the light source has a light emitting surface, and the light emitting surface is inclined toward the display panel.

10. The display apparatus according to claim 9, wherein at least one anti-reflection layer is disposed on at least one of the first surface and a second surface facing away from the first surface of the cover.

11. The display apparatus according to claim 10, wherein a polarizer is disposed on the display surface of the display panel, and an anti-reflection layer, an anti-glare layer, a low-reflection layer, or a combination thereof is disposed on one side of the polarizer facing away from the display panel.

12. The display apparatus according to claim 11, further comprising:
    a light control film, disposed between the display panel and the polarizer.

13. The display apparatus according to claim 1, wherein the frame has a portion extending between the light source and the display panel, in a normal direction of the first surface of the cover, the portion of the frame and the reflective layer are respectively located on two opposite sides of the light source, and a material of the frame includes white reflective material.

14. The display apparatus according to claim 1, further comprising:
    a light absorbing layer, disposed between the reflective layer and the cover, wherein the light absorbing layer defines the display area of the display apparatus.

* * * * *